United States Patent Office 3,363,973
Patented Jan. 16, 1968

3,363,973
CONDENSATION PRODUCTS OF ACRYLAMIDE
WITH ACETYLENE-MONO-UREINE
Pierre Talet, Alfortville, Seine, France, assignor to Nobel-Bozel, Paris, France, a joint-stock company of France
No Drawing. Filed June 25, 1963, Ser. No. 290,556
10 Claims. (Cl. 8—116.3)

The present invention has for its object condensation products of acrylamide with 4, 5-dihydroxyimidazolidone-2 (or acetylene-mono-ureine), new products which possess remarkable properties as dressings for cellulose textile materials.

Acetylene-mono-ureine has itself been proposed as a dressing for cellulose textiles, in the form of its dimethylol derivative having the formula:

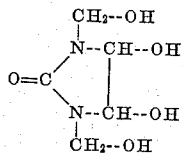

The four hydroxyls present in the molecule are apt to react with those of the cellulose so as to give cellulose textiles improved properties in various respects. However, textiles dressed in this way have a greatly reduced mechanical strength, which disadvantage is furthermore inherent in the majority of known dressing treatments, and which shows itself in a particularly disadvantageous manner in practice, on the textile so dressed, after bleaching with chlorine (Javel water).

As compared with dimethylolated acetylene-mono-ureine, the methods which form the object of the present invention give not only a much greater improvement in the dressing properties, but the strength of the dressed fabrics is much greater.

The basic product of the present invention is prepared by the condensation of one molecule of acetylene-mono-ureine with one molecule of acrylamide. It is characterized by a nitrogen content in the neighborhod of 22.2%, and also by the presence in its molecule of a carbonamide function which is in turn transformable to a mono- or dimethylol derivative on the nitrogen by treatment with formaldehyde.

The product is obtained in the form of white crystals which melt at 158/162° C., when they still contain 2.5% of water. These crystals are fairly soluble in water but very little soluble in methanol and in ethanol. Their solubility in water at 30° C. is 20.8% by weight; in methanol, 0.6%; in ethanol, 0.4%.

This compound is new and has not previously been described in any publication. Its method of formation and its properties make it probable that it corresponds to the following chemical formula:

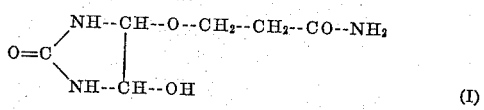
(I)

This basic product of the invention, when treated with formaldehyde, gives methylol derivatives on the atom of nitrogen of the carbonamide function and/or on the nitrogen atoms of the ureine function. It can therefore fix, per molecule, up to four molecules of formaldehyde; in other words, 189 grams of the said basic product are capable of chemically fixing up to 4 molecule-grams of formaldehyde. Considering Formula I above, this fixation of formaldehyde is explained by the following chemical process, with four molecules of formaldehyde:

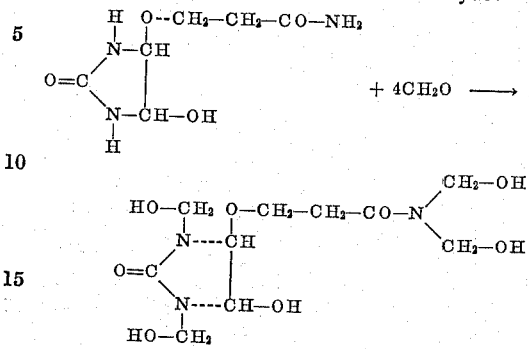

In order to obtain good dressing properties on textiles, it is not always necessary to fix four molecules of formaldehyde on the said basic product; for example it is often sufficient to fix a single molecule of formaldehyde. But when the dressed fabric must have a high resistance to chlorine, it is generally advantageous to cause all of the hydrogen atoms attached to the nitrogen atoms to react with the formaldehyde, which comes to the same thing as fixing four molecules of formaldehyde on the basic product.

Again considering Formula I above, the textile dressing products derived from the basic products thus correspond to the general formula:

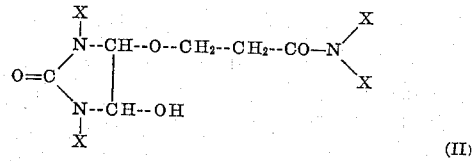
(II)

in which formula X represents an atom of hydrogen or a methylol group —CH$_2$—OH, at least one of the four X substitutes being a methylol group.

The method of preparation of the basic product (I) of the invention consists in causing a molecule of acetylene-mono-ureine to react with a molecule of acrylamide. The two products may for example be dissolved in water, preferably in stoichiometric proportions, if necessary by heating slightly. Then the reaction is initiated by heating to a moderate temperature, for example of the order of 60° C., until the reactions of the acrylamide disappear (for example the disappearance of any unsaturated link); the pH value of the mixture, which is slightly alkaline to start with, should be maintained above 7 up to the end of the reaction. There is thus obtained a solution from which the product (I) can be separated out by crystallisation.

The method of preparation of the dressing products for textiles (II) consists in causing the basic product (I) to react with from one to four molecules of formaldehyde. For example, the basic product (I) can be dissolved in an alkaline aqueous solution of formaldehyde, by heating slightly if necessary. The reaction is then started, always in an alkaline medium, by heating to a moderate temperature, for example from 40 to 60° C., until the desired quantity of free formaldehyde has disappeared. The reaction can be continued up to the practically complete disappearance of all of the free formaldehyde.

There is obtained an aqueous alkaline solution which will preferably be neutralized, at least partially. This solution, which contains in solution the desired product (II), may be distilled if this is necessary, for instance under vacuum at a moderate temperature (of the order of 40 to 50° C. for example), so as to separate out the water, which makes it possible to bring the solution to the commercial concentration desired for the market, this commercial concentration being preferably of the order of 60% by weight of active product.

For its application to textiles the solution, concentrated to $n\%$ of the active product, is brought to the desired dilution with water.

The said solution of product (II) may be practically exempt from free formaldehyde, which is advantageous for certain uses; for various textile applications, however, the presence of a relatively-high content of formaldehyde does not present any disadvantage.

It is of course also possible to isolate the product (II) formed (for example in the form of crystals) from the reaction medium, but this represents a useless complication in the case of textile uses.

The formaldehyde to be employed for the preparation of the products (II) may be in the form of one of the current commercial aqueous solutions at 30%, 37%, 40%, 42%, or higher, concentrations. The use of formaldehyde polymer, paraformaldehyde or trioxy-methylene, gives the same results.

It is obviously also possible to prepare the textile dressing products (II) by treating the basic product (I) formed in situ with formaldehyde.

Thus, one molecule of acetylene-mono-ureine can be condensed with one molecule of acrylamide, after which one to four molecules of formaldehyde are caused to react with the product (I) produced without isolating it from the reaction medium.

It is also possible to proceed to the simultaneous condensation of acetylene-mono-ureine with acrylamide and formaldehyde.

Finally, simultaneous condensation of urea can be effected with glyoxal (constituents of acetylene-mono-ureine), acrylamide and formaldehyde. In the latter case, there will be mixed, for example, a neutral aqueous solution of glyoxal with an alkaline aqueous solution of formaldehyde, and the acrylamide and the urea will be dissolved in this mixture. The desired reaction will then be initiated by heating in an alkaline medium to a moderate temperature, of the order of 60° C.

The product (I) can also be condensed with a second molecule of acrylamide and then treated with formaldehyde; the product (I) may be employed in the form of its constituent parts so as to be produced in situ. In other words, instead of one molecule of acrylamide, two molecules can be fixed on the acetylene-mono-ureine; there is then obtained the derivative comprising two carbamide functions in its molecule, and consequently capable of fixing up to 6 molecules of formaldehyde with the formation of a hexamethylol derivative which would have the following formula:

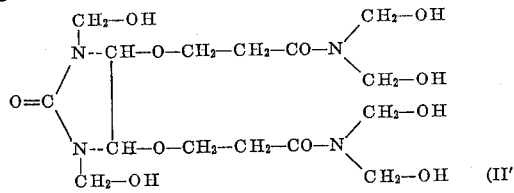

For the treatment of cellulose textiles with the products of the present invention, the $n\%$ solution of active product is brought to the desired dilution with water, after which the catalyst and the adjuvants are dissolved in the solution when so required. As catalysts, there will preferably be employed compounds either having an acidic nature or which are suitable for producing acids during the course of the treatment: tartaric acid, magnesium chloride, zinc chloride, etc.

The fabric to be treated is impregnated with the solution thus prepared in such manner that, after drying, the desired quantity of active product remains on the fibres, for example 5 to 10 grams of active material (dry) per square metre of fabric.

The fabric thus prepared is dried and then brought up to a temperature exceeding 100° C., preferably between 130° and 150° C., so as to cause the hydroxyl groups of the active product of the invention to react with the hydroxyls of the molecule of cellulose, this treatment generally requiring from a few minutes to about half an hour according to the temperature.

The dressed textiles thus obtained possess remarkable properties which will be illustrated below.

In order to make the invention more clearly understood, some examples of its application will be given below by way of illustration but not in any limitative sense.

*Example 1.—Basic product*

Into a vessel provided with a reflux cooler and a stirring device there are introduced 1,180 grams of acetylene-mono-ureine and 711 grams of acrylamide. 1600 grams of water are added, after which the vessel is placed in a bath, whose temperature is gradually increased. Complete solution is obtained at 57° C.

The pH value of the solution is then brought to 8.2 with tri-ethanolamine (about 4 grams). The temperature of the reaction medium is then brought up to 60° C. and this temperature is maintained for two hours.

The solution obtained is left to crystallize for twelve hours.

The crystals formed are separated by drying, and 700 grams of these crystals are collected.

The mother liquors are then distilled under vacuum at 50° C. until 1,275 grams of water have been eliminated. The solution obtained is left to crystallize out for twelve hours. The crystals formed are separated out by drying, and 630 grams of these crystals are collected.

The resulting mother liquors still contain 300 grams of crystallisable product which can be recovered and, after purification, added to the crystals previously obtained.

Taking into account only the first and second crystallization stages of the process, there have thus been collected 1,330 grams of white crystals melting at 158–162° C. and still containing 2.5% of water, having a nitrogen content of 22.0% and having the physical and chemical properties indicated in the foregoing description.

*Example 2.—Condensation of product of the basic compound with four molecules of formaldehyde*

Into a vessel provided with a reflux cooler and a stirrer device there are introduced 1,680 grams of aqueous solution at 30% by weight of formaldehyde, which is made alkaline by the addition of 2 grams of anhydrous baryta. 730 grams of the crystallized product obtained as in Example 1 are then added, after which the vessel is placed in a bath whose temperature is gradually increased. Complete solution is obtained at 45° C.

The pH value of the solution is then brought to 9.4 with anhydrous baryta (about 3 grams). The reaction medium is then heated at a temperature of 45° C. for two hours.

The alkalinity of the solution obtained is reduced to a pH value of 8.0 by passing through it a currrent of carbon dioxide gas, after which it is distilled under vacuum at 40–45° C. until 352 grams of water have been eliminated.

The residue of the distillation is filtered in order to eliminate from it the precipitated barium carbonate.

There are thus obtained 1,993 grams of a clear solution containing 60% of dry extract containing now only an insignificant proportion of free formaldehyde. After dilution and addition of the necessary adjuvants, this solution is intended to be used for the treatment of textiles.

*Example 3.—Condensation product with the formaldehyde of the basic compound formed in situ*

Into a vessel provided with a reflux cooler and a stirring device there are charged 400 grams of acetylene-mono-ureine and 237 grams of acrylamide. 480 grams of water are added, after which the vessel is placed in a bath whose temperature is gradually increased until the products are completely dissolved.

The pH value of the solution is then brought to 8.4 with tri-ethanolamine. The temperature of the reaction medium is then brought up to 60° C. and this temperature is maintained for two hours.

There are then added 800 grams of an aqueous solution at 30% by weight of formaldehyde which has been previously made alkaline, after which the solution is stirred.

The pH value of the mixture is brought to 9.2 by anhydrous baryta. The reaction medium is then maintained at a temperature of 60° C. while checking the disappearance of the formaldehyde. The heating is stopped when the content of free formaldehyde reaches 8 to 7%.

The solution obtained is neutralized to a pH value of 7.3 with carbon dioxide gas, after which it is distilled under vacuum until 600 grams of water have been eliminated.

The residue of the distillation is filtered in order to eliminate from it the precipitated barium carbonate.

There are thus obtained 1300 grams of a syrup of a yellowish colour, stable during storage, the characteristics of which are as follows:

| | |
|---|---|
| Dry extract _____ percent__ | 60 |
| Free formaldehyde _____ do____ | 7.2 |
| pH value _____ | 7.3–7.5 |
| Density _____ | 1.210 |

In order to illustrate the method of application of the products of the invention to the treatment of textiles, and also the properties of the dressed fabrics thus obtained, an example is given below without any limitative sense.

The fabric chosen was a cotton poplin having a weight of 120 grams per square metre.

The product obtained in Example 2 was dissolved in water so as to obtain a solution containing 5 grams of dry substance per litre. In this solution 20 grams of zinc chloride were dissolved per litre. The fabric to be treated is impregnated with this solution in such manner that, after drying, there remains on the fabric 7 to 8 grams of active material (dry) per square metre of fabric.

The fabric thus prepared is dried at 90° C. for 10 minutes and the temperature is then raised to 150° C. for 5 minutes.

After conditioning the fabric for 24 hours in a room regulated to 65% relative humidity and 20° C., checks were carried out, on the one hand on the fabric dressed according to the method of the invention, and on the other hand on an identical fabric dressed under the optimum identical conditions with a dressing product which is known and appreciated, dimethylol-acetylene-mono-ureine. The first fabric will be known as the "fabric according to the invention"; the second as the "reference fabric."

The tests carried out were as follows:

"Shrinkage" of the fabric, expressed in percent, after washing at boiling point in a washing machine;

"Non-creasing" of the fabric, determined by the known method, which expresses the non-creasing properties by the value of a residual angle of the fabric previously folded under standard conditions;

"Resistance to bursting" expressed in kg. per sq. cm., measured with the bursting-meter EC2 of Lhomargy;

"Mechanical strength," expressed by the force in kg. required to break a test-sample of fabric of 5 cm. in width.

RESULT OF TESTS

| | Fabric according to the invention | | Reference fabric | |
|---|---|---|---|---|
| | Warp | Weft | Warp | Weft |
| Shrinkage after— | | | | |
| 1 washing_____ | 0 | 0 | 1.2 | 0 |
| 2 washings_____ | 0.4 | 0 | 2 | 0 |
| Non-creasing: | | | | |
| Fabric not washed_____ | 148 | 155 | 144 | 145 |
| After 1 washing_____ | 146 | 149 | 129 | 133 |
| Mechanical strength_____ | 26.1 | 26.2 | 14.0 | 11.2 |
| Resistance to bursting: | | | | |
| Of the dressed fabric, as it is____ | 2.7 | | 1.3 | |
| After bleaching with chlorine and ironing_____ | 3.1 | | 1.3 | |

From the above it can be seen that, with respect to the reference fabric, the fabric according to the invention shows a remarkable performance: better non-creasing properties after washing; better mechanical strength; better resistance to bursting, especially after bleaching with chlorine and ironing.

I claim:

1. A dressing composition for textiles comprising (1) the alkaline condensation product of one molecule of acetylene-mono-ureine with one molecule of acrylamide and with at least one molecule of formaldehyde, (2) water and (3) acid.

2. A dressing composition for textiles comprising an acidic, aqueous solution of the alkaline condensation product of one molecule of acetylene-mono-ureine with one molecule of acrylamide and with one to four molecules of formaldehyde.

3. A dressing composition for textiles comprising an acidic, aqueous solution of the alkaline condensation product of one molecule of acetylene-mono-ureine with two molecules of acrylamide and with from one to six molecules of formaldehyde.

4. A method of treating cellulose fiber containing material comprising: (1) contacting said material in the presence of acid with an aqueous dressing solution comprising an active compound having the formula:

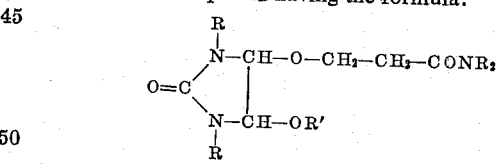

wherein R is selected from the group consisting of hydrogen and the —CH$_2$OH radical, R' is selected from the group consisting of hydrogen and the radical

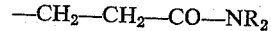

at least one R group being the —CH$_2$OH radical; (2) impregnating said material with said solution; and (3) drying and heating to a temperature exceeding 100° C. for a period of from about three minutes to half an hour.

5. A method in accordance with claim 4, wherein said dressing solution contains about 5 grams per litre of said active compound.

6. A method in accordance with claim 4, wherein said heating temperature lies between 130 and 150° C.

7. A composition in accordance with claim 1 wherein said acid comprises a catalyst selected from the group consisting of tartaric acid, magnesium chloride and zinc chloride.

8. A method in accordance with claim 4 wherein said acid comprises a catalyst selected from the group consisting of tartaric acid, magnesium chloride and zinc chloride.

9. A method in accordance with claim 4 wherein said treated material is a textile and said material during impregnation retains from 5 to 10 grams of said active compound per square meter of textile material.

10. A cellulose fiber containing material comprising cellulose fibers and a coating reacted with said cellulose, said coating having the formula:

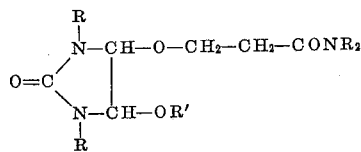

wherein R is selected from the group consisting of hydrogen and the —CH$_2$OH radical and R' is selected from the group consisting of hydrogen and the radical

—CH$_2$—CH$_2$—CONR$_2$ at least one R group being the —CH$_2$OH radical.

References Cited

UNITED STATES PATENTS

| | | | |
|---|---|---|---|
| 2,173,005 | 9/1939 | Strain | 8—116.3 |
| 3,024,246 | 3/1962 | Goodman | 8—116.3 |
| 3,246,946 | 4/1966 | Gardon | 8—116.3 |
| 3,187,006 | 6/1965 | Druey et al. | 260—296 X |
| 3,209,010 | 9/1965 | Gagliardi | 260—309.7 |

FOREIGN PATENTS 1,110,606  7/1961  Germany.

OTHER REFERENCES

Fieser et al.: Organic Chemistry, 3rd edition, page 168, pub. Reinhold Publishing Corp., N.Y.C.

NORMAN G. TORCHIN, *Primary Examiner.*

DONALD LEVY, *Examiner.*

UNITED STATES PATENT OFFICE
CERTIFICATE OF CORRECTION

Patent No. 3,363,973  January 16, 1968

Pierre Talet

It is hereby certified that error appears in the above numbered patent requiring correction and that the said Letters Patent should read as corrected below.

In the heading to the printed specification, after line 6, insert -- Claims priority, application France, Dec. 28, 1962, 920,090 --.

Signed and sealed this 18th day of March 1969.

(SEAL)
Attest:

Edward M. Fletcher, Jr.
Attesting Officer

EDWARD J. BRENNER
Commissioner of Patents